INVENTOR.
Theodore A. Byles
BY Mueller and Aichele

Attys.

United States Patent Office 3,307,101
Patented Feb. 28, 1967

3,307,101
STORAGE BATTERY CONDITION INDICATOR WITH TEMPERATURE AND LOAD CURRENT COMPENSATION
Theodore A. Byles, Villa Park, Ill., assignor to Motorola, Inc., Chicago, Ill., a corporation of Illinois
Filed Dec. 10, 1962, Ser. No. 243,329
5 Claims. (Cl. 324—29.5)

This invention relates to electrical indicating circuits, and more particularly to a circuit for indicating the state of charge of a storage battery.

In the past, simple ammeters and indicating lamps have been used in automobiles and the like to indicate whether or not the battery is being charged by the generator or alternator. Such a battery indicator does not show the condition of the battery but merely indicates whether the battery is being charged or discharged. Accordingly, a simple ammeter or indicator lamp does not permit the operator to determine the condition of charge within the battery itself, and in many instances the indicator lamp or ammeter will indicate that the battery is being charged at a proper rate but the battery might be in poor condition.

It has also been the practice to test multi-cell storage batteries by comparing the conditions of the individual cells of the battery, either by measuring the specific gravities of the electrolyte, or by checking the cell voltage. Such testing requires stopping the automobile and gaining access to the battery itself, and also requires the use of test equipment which the average automobile user does not have.

The terminal voltage of a storage battery can be an indicator of its state of charge. In a lead-acid type automotive battery, 12.6 volts across the terminals at no load usually indicates full charge, and about 11.9 volts indicates a discharged condition. The terminal voltage, however, varies considerably with discharge and charge currents, i.e., as the battery is being used, and a simple voltmeter reading is of little value in determining the state of charge or condition of the storage battery.

Accordingly it is an object of this invention to provide a state of charge indicator circuit for a storage battery which will compensate an indicator meter for fluctuations in battery terminal voltage due to variations in load.

Still another object of the present invention is to provide a new and improved circuit for indicating the condition of a storage battery.

It is a further object of this invention to provide a state of charge indicator including an indicating meter and relatively simple and standard components to reflect the true condition of a storage battery.

A feature of the invention is the provision of a voltmeter for indicating the terminal voltage of a storage battery, and a circuit connected thereto to compensate the voltmeter according to variations in current flow to the load.

Another feature of the invention is the provision of a voltmeter and a zener diode connected in series across the terminals of a storage battery to produce an expanded scale reading, and the further provision of a transistor circuit connected to the zener diode to bias same in accordance with changing load current, so that the meter will only indicate changed battery potential due to deteriorating condition.

A further feature of the invention is the provision, in the above mentioned transistor circuit, of a transistor having base and emitter electrodes connected across a relatively small resistance, which resistance is connected in series between the storage battery and a load, the collector electrode of the said transistor being connected to the zener diode to bias the same as set forth above.

A still further feature of the invention is the provision, in the above transistor circuit, of a forward biased diode for biasing the base electrode of the transistor, thereby providing stabilization of bias voltage upon the zener diode to insure meter accuracy.

Briefly a circuit used in connection with the invention includes a degenerative transistor amplifier driving a collector load resistor. A zener diode and a voltmeter are connected from the positive terminal of a storage battery to the collector resistor. A relatively small resistor is placed in series between the positive terminal of the storage battery and the load of electrical system. The base and emitter electrodes of the transistor are connected across this small resistor, and the base of the transistor is forward biased by a second diode. The zener diode and voltmeter in series provide an expanded scale reading of the difference between the battery terminal voltage and the drop across the collector resistor. At no load the terminal voltage will accurately reflect the condition of the battery, however, with increasing load currents the terminal voltage of the battery drops accordingly. Any drop greater than normal may indicate a deteriorating condition in the storage battery. As load current increases, the drop across the small resistor decreases the bias on the transistor. The value of the various components of the system may be selected so that the decreased output of the transistor decreases the drop across the collector resistor to compensate for the drop in battery terminal voltage due to increased load current. Thus, the normal drop in terminal voltage will not register on the voltmeter, however any deviation from the normal drop will be so indicated.

Figure 1:
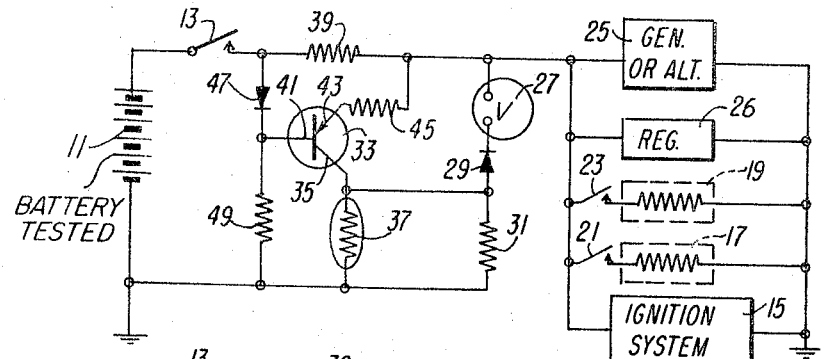
FIG. 1 is a schematic diagram of an automotive electrical system utilizing the invention.

Referring now to FIG. 1, storage battery 11 is poled to conduct current through an ignition switch 13 to various units of an electrical load in the electrical system of an automobile. These units include ignition system 15 and may further include other units 17 and 19 which represent, for example, the lights and radio of an automobile. Their associated switches are represented at 21 and 23. In addition to the load, the automotive electrical system may include a generator, or alternator rectifier combination 25 and a voltage regulator 26. The generator or alternator 25 supplies current to charge battery 11 and operates units 15, 17 and 19 of the electrical system. A transistor 33 is provided in the circuit with its collector electrode 35 connected to drive a resistor 31. A negative temperature coefficient resistor or thermistor 37 is connected in parallel with resistor 31 to compensate for changes in transistor amplification with temperature. A resistor 39 of relatively small value is placed in series between battery 11 and the load. The base electrode 41 and emitter electrode 43 of transistor 33 are connected across resistor 39, and the transistor bias network further includes resistor 45 and diode 47. Diode 47 may be a silicon unit, forward biased to give reference bias to the transistor. Completing the bias network for transistor 33 is resistor 49 connected between base electrode 41 and ground.

A 5 ma. voltmeter 27 and an 8 volt zener diode 29 are connected in series from the positive side of battery 11 to the collector load resistor 31. The constant drop across diode 29 causes meter 27 to give an expanded scale reading. Thus, meter 27 will indicate the difference between the battery terminal voltage and the drop across resistor 31.

At no load condition, that is, when no current is flowing through resistor 39, voltmeter 27 may be calibrated to register half scale deflection for about 12.6 volts battery terminal voltage. The 12.6 volt terminal voltage of the battery is about normal for the typical automotive storage battery in no load condition. As load current increases, the battery terminal voltage will drop. This is perfectly normal and does not necessarily reflect a deteriorating battery condition. It therefore becomes necessary to compensate meter 27 for this normal drop in battery terminal voltage. This is done by transistor 33, which drives resistor 31. As load current increases, the drop in voltage across resistor 39 becomes greater, reducing the base emitter bias of transistor 33. The collector current of transistor 33 drops accordingly, causing a reduction in the voltage drop across resistor 31. This, of course, affects the reading of meter 27. By selecting components of the proper value, meter 27 may be exactly compensated for that amount of drop in terminal voltage across battery 11 due to increased load current. Any further drop in this terminal voltage due to deteriorating battery condition will not be reflected across resistor 39, and hence will be indicated by meter 27.

Under charging current conditions, that is when generator or alternator 25 is charging storage battery 11, the meter will read up-scale or higher than the no load indication. Although not truly a "state of charge" reading, it is still an indication that the generator is working properly and that the battery is having its charge replenished. The meter may be suitably graduated. For example, red markings may be used for readings below 12.3 volts no load terminal voltage and the operator of the automobile need only note whether the meter pointer stays above the minimum safe voltage.

The use of bias diode 47 greatly reduces the dependence of the collector current upon supply voltage. This tends to stabilize the voltage reading across the resistor 31 making it less dependent upon the normal variations in battery voltage.

The following values, when used in the described circuit, were found to give satisfactory results:

| | | |
|---|---|---|
| Resistor 39 | ohm | 0.003 |
| Resistor 45 | ohms | 4.7 |
| Resistor 49 | do | 1,000 |
| Resistor 31 | do | 47 |
| Zener diode 29 (constant drop) | volts | 8 |
| Meter 27 | ma | 5 |

Figure 3:
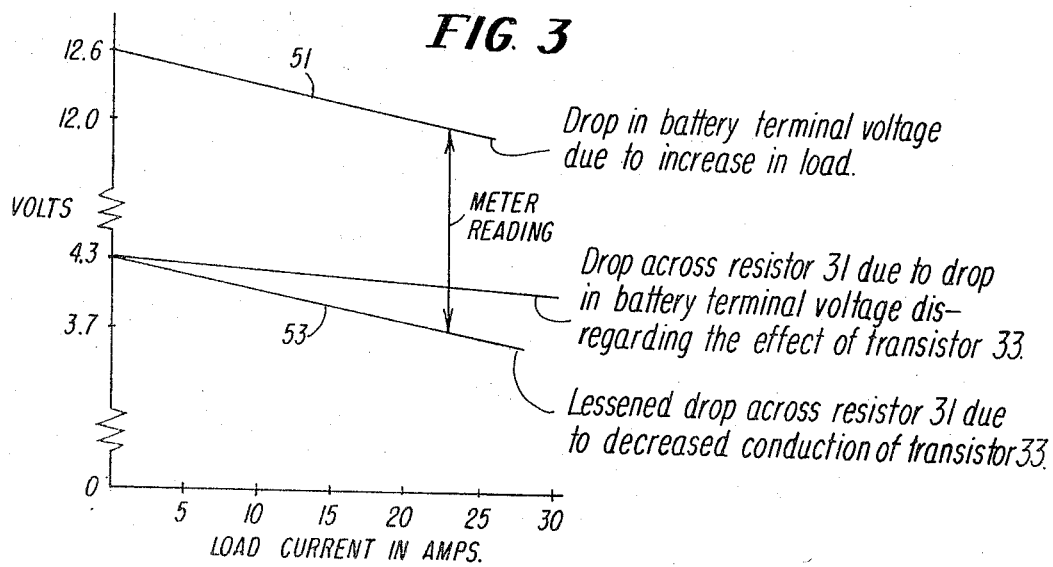
FIG. 3 is a plot of load current versus selected voltage readings for a circuit utilizing the invention.

Referring now to FIG. 3, a general indication of the operation of the circuit is shown. Line 51 represents the battery terminal voltage for a typical storage battery. As load current increases from 0 to approximately 30 amperes, the normal automotive storage battery will decline from about 12.6 volts to about 12.0 volts. Disregarding the effect of transistor 33 for the moment, the voltage drop across resistor 31 will vary roughly in proportion to the battery terminal voltage. By utilizing the transistor amplifier in the circuit, however, the voltage at the juncture between zener diode 29 and resistor 31 may be influenced to vary through the same range as the normal variation in battery terminal voltage. With components of the listed values in the circuit, this last mentioned voltage will decline from about 4.3 volts at zero load to approximately 3.7 volts at a load of 30 amperes. This is represented by line 53. The meter 27 therefore reads the difference, modified of course by the zener expander, between the voltage across resistor 31 and the battery terminal voltage. Assuming the drop in battery terminal voltage is normal, the meter reading will remain the same throughout the range from zero to 30 amperes. However, if the condition of the battery deteriorates, the terminal voltage will decrease more rapidly than the voltage at the juncture between diode 29 and resistor 31, influencing the meter reading to give the proper warning.

Figure 2:
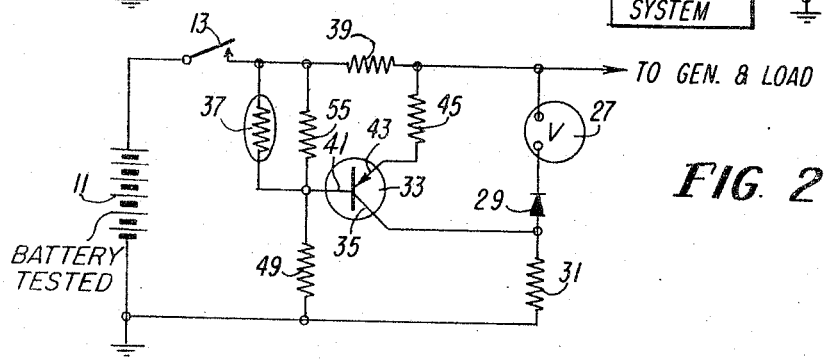
FIG. 2 is a schematic diagram of a modified circuit utilizing the invention.

Referring now to FIG. 2, a modification of the circuit is depicted. The circuit is practically identical to the circuit of FIG. 1 except for the fact that in the bias network for transistor 33, resistor 55 is substituted for diode 47. With the listed values for the first circuit, a resistor of 47 ohms would be sufficient for this purpose. Thermistor 37 has been moved to be connected in parallel with resistor 55, and still acts to compensate for variations in transistor amplification with temperature.

It may therefore be seen that the invention provides a circuit for indicating the state of charge of a storage battery, which circuit is self-compensating for normal variations in terminal voltage of the battery with load current. In addition, it is possible to attain very stable operation by means of a forward biased silicon diode used in the biased network of a compensating transistor.

I claim:

1. A device for indicating the condition of a storage battery which supplies current to a load, said device including in combination, a pair of conductors adapted to be energized by the storage battery, meter means coupled between said conductors and indicating a difference in potential when said conductors are energized by the storage battery, a compensating circuit including resistance means connectable in series between the storage battery and the load and further including transistor means having an output responsive to the change of potential across said resistance means, and circuit means coupling said transistor means to said meter means for variably biasing the same in accordance with changing load current, said compensating circuit compensating the voltage applied by said conductors to said meter means for the normal variation in potential across the storage battery resulting from fluctuating load current flow, whereby said meter means will indicate other variations of potential across the storage battery due to changes in the condition thereof.

2. A device for indicating the condition of a storage battery which supplies current to a load, said device including in combination, first and second conductors adapted to be connected respectively to the positive and negative terminals of the battery, first resistance means connectable in series between the storage battery and the load, transistor means coupled to said first resistance means and having an output current responsive to changes in potential across said first resistance means, second resistance means coupled to said transistor means so that the drop in potential thereacross is responsive to the output current of said transistor means, and a voltmeter and a zener diode connected between said first and second conductors in series with said second resistance means, said voltage across said second resistance means compensating said voltmeter for the variation in potential across the storage battery produced by fluctuating load current flow, whereby said voltmeter will only be influenced by variations in potentials across the storage battery due to changes in the condition thereof.

3. A device for indicating the condition of a storage battery which supplies current to a load, said device including in combination, first and second conductor means adapted to be connected respectively to the positive and negative terminals of the battery and to be connected to a load for supplying current thereto, said first conductor means including a first resistor in series between the storage battery and the load, a transistor having base, emitter and collector electrodes, said base and emitter electrodes being connected across said first resistor so that the bias between said base and emitter electrodes is responsive to changes in potential across said first resistor, a second resistor connected between said collector electrode of said transistor and said second conductor means so that the drop in potential thereacross is responsive to the current in said collector electrode, and a voltmeter and a zener diode connected in series between said first conductor means and said second resistor to produce an expanded scale meter reading, said voltage across said second resistor compensating said voltmeter for the variation in potential across the battery produced by fluctuating load current flow so that said voltmeter will only be influenced by variation in potential across the storage battery due to changes in the condition of the storage battery.

4. A device for indicating the condition of a storage battery which supplies current to a load, said device including in combination, first and second conductor means adapted to be connected respectively to the positive and negative terminals of the battery, said first conductor means including a first resistor for connection in series between the storage battery and the load, a transistor having base, emitter and collector electrodes, a forward biased silicon diode connected between said emitter and base electrodes to forward bias said transistor, said first resistor being also connected between said base and emitter electrodes so that the bias between the same is responsive to changes in potential across said first resistor, a second resistor connected between said collector electrode of said transistor and said second conductor means so that the drop in potential thereacross is responsive to the current in said collector electrode, a voltmeter and a zener diode connected in series between said first conductor means and said second resistor to produce an expanded scale meter reading, and a thermistor connected in parallel with said second resistor to provide temperature compensation to said transistor, said voltage across said second resistor compensating said voltmeter for the normal variation in potential across the battery coincident with fluctuating load current flow so that said voltmeter will only be influenced by variation in potential across the storage battery due to changes in condition of the storage battery.

5. A device for indicating the condition of a storage battery which supplies current to a load, said device including in combination, first and second conductor means adapted to be connected respectively to the positive and negative terminals of the battery, said first conductor means including a first resistor for connection in series between the storage battery and the load, a transistor having base, emitter and collector electrodes, a second resistor connected between said collector and base electrodes for forward biasing said transistor, a thermistor connected in parallel with said second resistor for providing temperature compensation to said transistor, said first resistor also being connected between said base and emitter electrodes so that the bias between said electrodes is responsive to changes in potential across said first resistor, a third resistor connected between said collector electrode of said transistor and said second conductor means, so that the drop in potential thereacross is responsive to the current in said collector electrode, and a voltmeter and a zener diode connected in series between said first conductor means and said third resistor to produce an expanded scale voltmeter reading, so that said meter will be compensated for the normal variation in potential across the battery resulting from fluctuating current flow and therefore will only be influenced by variation in potential across the storage battery due to changes in the condition of the storage battery.

References Cited by the Examiner
UNITED STATES PATENTS

| | | | |
|---|---|---|---|
| 3,024,388 | 3/1962 | Blitchington | 324—110 X |
| 3,068,406 | 12/1962 | Dellinger | 324—131 X |
| 3,079,556 | 2/1963 | Connelly et al. | 324—131 |
| 3,125,718 | 3/1964 | Race | 324—29.5 |

RUDOLPH V. ROLINEC, *Primary Examiner.*

FREDERICK M. STRADER, WALTER L. CARLSON, *Examiners.*

C. F. ROBERTS, *Assistant Examiner.*